United States Patent
Nakazawa

[11] Patent Number: 5,949,589
[45] Date of Patent: Sep. 7, 1999

[54] RETRO-FOCUS TYPE LENS

[75] Inventor: Kimiaki Nakazawa, Omiya, Japan

[73] Assignee: Fuji Photo Optical Co., Ltd., Saitama, Japan

[21] Appl. No.: 09/035,753

[22] Filed: Mar. 6, 1998

[30] Foreign Application Priority Data

Mar. 18, 1997 [JP] Japan ...................................... 9-085921

[51] Int. Cl.⁶ .............................. G02B 13/04; G02B 3/00; G02B 13/22; G02B 9/12
[52] U.S. Cl. .......................... 359/753; 359/651; 359/663; 359/682; 359/784
[58] Field of Search ..................................... 359/649–651, 359/663, 749–753, 680–682, 784

[56] References Cited

U.S. PATENT DOCUMENTS

| | | | |
|---|---|---|---|
| 3,856,386 | 12/1974 | Fujioka | 359/749 |
| 3,874,770 | 4/1975 | Shimizu | 359/751 |
| 3,923,369 | 12/1975 | Nakamura | 359/749 |
| 3,958,865 | 5/1976 | Sakai | 359/750 |
| 3,981,563 | 9/1976 | Nakamura | 359/749 |
| 4,025,170 | 5/1977 | Kawamura | 359/751 |
| 4,046,459 | 9/1977 | Kawamura | 359/751 |
| 4,061,421 | 12/1977 | Nakagawa | 359/749 |
| 4,437,735 | 3/1984 | Momiyama | 359/749 |
| 5,331,462 | 7/1994 | Yano | 359/651 |
| 5,812,326 | 9/1998 | Yamada | 359/651 |

Primary Examiner—Georgia Epps
Assistant Examiner—Evelyn A. Lester
Attorney, Agent, or Firm—Snider & Chao; Ronald R. Snider

[57] ABSTRACT

Negative, positive, and positive lens groups are disposed successively from the larger conjugate length side, and focal length adjustment is effected by the convex lens disposed on the smallest conjugate length side of the first lens group, thereby yielding a long back focus and a telecentric characteristic, decreasing distortion and chromatic aberration, and simplifying the focusing structure. Successively from the larger conjugate length side, a first lens group $G_1$ having a negative refracting power and including a convex lens $L_5$ disposed on the smallest conjugate length side, a second lens group $G_2$ having a positive refracting power and causing a luminous flux diverged by the first lens group $G_1$ to become substantially afocal, and a third lens group $G_3$ having a positive refracting power are disposed, and the convex lens $L_5$ disposed on the smallest conjugate length side of the first lens group $G_1$ is moved on an optical axis so as to effect focus adjustment.

4 Claims, 11 Drawing Sheets

FIG. 1
EXAMPLE 1

FIG.2
EXAMPLE 2

FIG. 3
EXAMPLE 3

FIG. 4
EXAMPLE 4

FIG. 5
EXAMPLE 5

FIG.7A EXAMPLE 2 F/3.50

FIG.7B EXAMPLE 2 ω=33.7°

FIG.7C EXAMPLE 2 ω=33.7°

FIG.7D EXAMPLE 2 ω=33.7°

FIG.8A EXAMPLE 3
FIG.8B EXAMPLE 3
FIG.8C EXAMPLE 3
FIG.8D EXAMPLE 3

FIG. 11
PRIOR ART

RETRO-FOCUS TYPE LENS

RELATED APPLICATIONS

This application claims the priority of Japanese Patent Application No. 9-85921 filed on Mar. 18, 1997, which is incorporated herein by reference.

BACKGROUND OF THE INVENTION

1. Field of the Invention

The present invention relates to a retro-focus type lens and, in particular, to a retro-focus type lens used in a color liquid crystal projector which combines a plurality of images having different kinds of color information by a compound prism and then projects, under magnification, the resulting composite image onto a screen surface.

2. Description of the Prior Art

There have conventionally been proposed various kinds of color liquid crystal type projectors which projects, in an optically overlaying fashion onto a screen surface through a projection lens, images displayed on a plurality of liquid crystals (liquid crystal light valves).

An example of conventional color liquid crystal type projectors will be explained with reference to FIG. 11.

Figure 11:
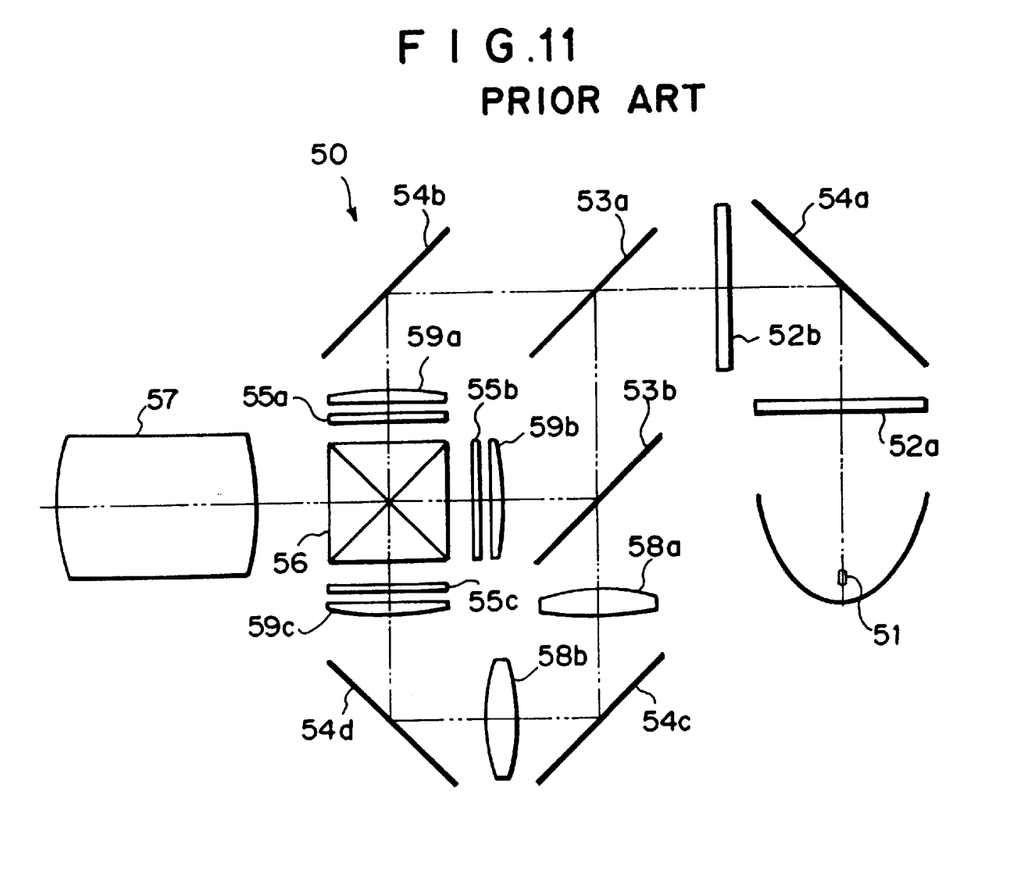
FIG. 11 is a sectional view showing an example of conventional color liquid crystal type projectors.

As shown in FIG. 11, this conventional color liquid crystal type video projector 50 comprises a light source 51; a pair of lens arrays 52a and 52b; first and second dichroic mirrors 53a and 53b for separating three primary color light components; first, second, third, and fourth total reflection mirrors 54a, 54b, 54c, and 54d; three liquid crystal display panels 55a (for red light), 55b (for green light), and 55c (for blue light); a dichroic prism 56 for combining three primary color light components together; and a projection lens 57 disposed on the exit side of the dichroic prism 56.

The light source 51 is a high-luminance white light source such as halogen lamp or metal halide lamp.

Usually, on the exit side of the light source 51, a UV/IR cut filter for cutting ultraviolet and infrared rays is disposed, whereas cooling means for cooling the light source 51 and the vicinity thereof by air is provided.

The first dichroic mirror 53a is a blue/green light reflecting mirror, whereas the second dichroic mirror 53b is a green light reflecting mirror. Each of these mirrors comprises a glass substrate and a dichroic film coated thereon which is made of a dielectric multilayer film having a spectral characteristic for reflecting a predetermined primary color light component as a mirror.

Each of the three liquid crystal display panels 55a, 55b, and 55c is constituted by a liquid crystal display device of a twisted nematic type (TN, STN, or TFT type) or the like, and displays an image in response to its corresponding liquid crystal signal from a non-depicted liquid crystal driver, thereby modulating its incident primary color light component in terms of luminance.

Further, the dichroic prism 56 is constituted by four pieces of rectangular prisms joined together. Its two orthogonal joining surfaces are formed with dichroic films made of dielectric multilayer films respectively having spectral characteristics as red and blue light reflecting mirrors. Accordingly, the dichroic prism can combine three primary color light components of red, green, and blue into a single white luminous flux.

A field lens 58a and a relay lens 58b are disposed in a system for blue light; whereas field lenses 59a, 59b, and 59c are respectively disposed in front of the liquid crystal display panels 55a, 55b, and 55c.

The projection lens 57 used in thus configured liquid crystal video projector 50 projects the combined three primary color light components onto a screen disposed at a predetermined distance, such that a full-color image can be projected onto the screen under magnification.

The projection lens 57 is required to have the following characteristic.

First, since light components are combined by the cross dichroic prism 56, the projection lens 57 is required to minimize chromatic aberration, have long back focus, and be telecentric. Also, in order to obtain a large projection image in a short projection distance, it is necessary for the projection lens 57 to have a wider angle. Further, in order to project the square liquid crystal display panels 55a, 55b, and 55c without distortion, the projection lens 57 should lower its distortion.

Conventionally known as a wide angle lens having a long back focus is a retro-focus type lens used as a wide angle lens of a single lens reflex camera.

The retro-focus type lens used as a wide angle lens of the conventional single lens reflex camera has a hard exit angle, thus failing to be telecentric. Accordingly, in the case where such a retro-focus type is used in a color liquid crystal type projector, when color light components are combined by the cross dichroic prism 56, color shading may occur on the screen. Therefore, the conventional retro-focus type lens cannot be used as the projection lens of the color liquid crystal type video projector as it is.

Known as the method of focusing the conventional projection lens are a method in which the whole lens system is moved together, and a method in which a plurality of lens groups are moved and floated so as to correct the image surface inclination caused by focusing.

In these conventional focusing methods, however, the lens barrel system at the attachment section between the lenses and their mount increases its size, and the configuration of the apparatus is complicated.

SUMMARY OF THE INVENTION

In view of the foregoing circumstances, it is an object of the present invention to provide a compact retro-focus type lens having a long back focus, a telecentric characteristic, favorable optical performances with minimized distortion and chromatic aberration, and a simple focusing structure.

The retro-focus type lens in accordance with the present invention comprises, successively from a larger conjugate length side, a first lens group having a negative refracting power and including a convex lens disposed on the smallest conjugate length side, a second lens group having a positive refracting power and causing a luminous flux diverged by the first lens group to become substantially afocal, and a third lens group having a positive refracting power; wherein the convex lens disposed on the smallest conjugate length side of the first lens group is moved on an optical axis so as to effect focus adjustment.

Preferably, the first lens group comprises at least two convex lenses, and at least two concave lenses each having a surface with a smaller radius of curvature directed onto the smaller conjugate length side.

Preferably, the retro-focus type lens in accordance with the present invention satisfies the following conditional expression:

$$1.3 < f_{1R}/f_0 < 3.5$$

wherein $f_{1R}$ is a focal length of the convex lens disposed on the smallest conjugate length side of the first lens group, and $f_0$ is a focal length of the whole system.

Preferably, the third lens group comprises, successively from the larger conjugate length side, a cemented lens composed of a convex lens and a concave lens, and at least two convex lenses.

DESCRIPTION OF THE PREFERRED EMBODIMENTS

In the following, embodiments of the present invention will be explained with reference to the accompanying drawings.

FIGS. 1 to 5 respectively show configurations of the retro-focus type lenses in accordance with Examples 1 to 5 of the present invention.

As shown in FIGS. 1 to 5, the retro-focus type lens in accordance with each of the examples of the present invention is made of 10 sheets (9 sheets in Example 4) in total of lenses comprising, successively from the larger conjugate length side, a first lens group $G_1$ having a negative refracting power, a second lens group $G_2$ having a positive refracting power and causing a luminous flux diverged by the first lens group $G_1$ to become substantially afocal, and a third lens group having a positive refracting power. The fifth lens $L_5$ (fourth lens $L_4$ in Example 4) is movable on an optical axis X. Focus adjustment is effected as the fifth lens $L_5$ (fourth lens $L_4$ in Example 4) is moved on the optical axis X. Further, a filter block 1 is disposed on the smaller conjugate length side of the whole system.

Such a lens configuration can yield a long back focus and a telecentric characteristic, while ameliorating distortion and chromatic aberration.

Also, as the fifth lens $L_5$ (fourth lens $L_4$ in Example 4) disposed on the smallest conjugate length side of the first lens group $G_1$ is moved on the optical axis X to effect focus adjustment, the lens barrel has a smaller diameter, whereby the structure of the apparatus becomes simple and compact.

The first lens group $G_1$ comprises at least two convex lenses $L_1$ and $L_5$ ($L_1$ and $L_4$ in Example 4), and at least two concave lenses $L_2$, $L_3$, and $L_4$ ($L_2$ and $L_3$ in Example 4) each having a surface with a smaller radius of curvature directed onto the smaller conjugate length side.

As the first lens group $G_1$ has such a lens configuration, distortion and chromatic aberration can be further ameliorated.

Also, the retro-focus type lens is configured so as to satisfy the following conditional expression:

$$1.3 < f_{1R}/f_0 < 3.5$$

wherein $f_{1R}$ is a focal length of the fifth lens $L_5$ (fourth lens $L_4$ in Example 4) disposed on the smallest conjugate length side of the first lens group $G_1$, and $f_0$ is a focal length of the whole system.

When the value of $f_{1R}/f_0$ is below the lower limit of the above expression, the power of the focusing lens may become too strong, thereby generating a large amount of various kinds of aberration, such as chromatic aberration in particular.

When the value of $f_{1R}/f_0$ exceeds the upper limit of the above expression, the power of the focusing lens may become too small, thus increasing the diameter of the front-side lens too much and elongating the moving distance of the lens, whereby it becomes difficult for the whole lens system to be made compact.

Therefore, as the above-mentioned conditional expression is satisfied, various kinds of aberration, such as chromatic aberration in particular, are made favorable, and the whole lens system is made compact.

The second lens group $G_2$ is made of a lens $L_6$ ($L_5$ in Example 4) having a positive refracting power.

The second lens group $G_2$ causes the luminous flux diverged by the first lens group $G_1$ to become substantially afocal.

The third lens group $G_3$ comprises, successively from the larger conjugate length side, a cemented lens composed of a convex lens $L_7$ and a concave lens $L_8$ (a convex lens $L_6$ and a concave lens $L_7$ in Example 4), and at least two convex lenses $L_9$ and $L_{10}$ (convex lenses $L_8$ and $L_9$ in Example 4).

As a result of this configuration, the telecentric characteristic can be further ameliorated, and chromatic aberration can be corrected.

In the following, the above-mentioned Examples 1 to 5 will be explained with reference to specific values.

EXAMPLE 1

Figure 1:
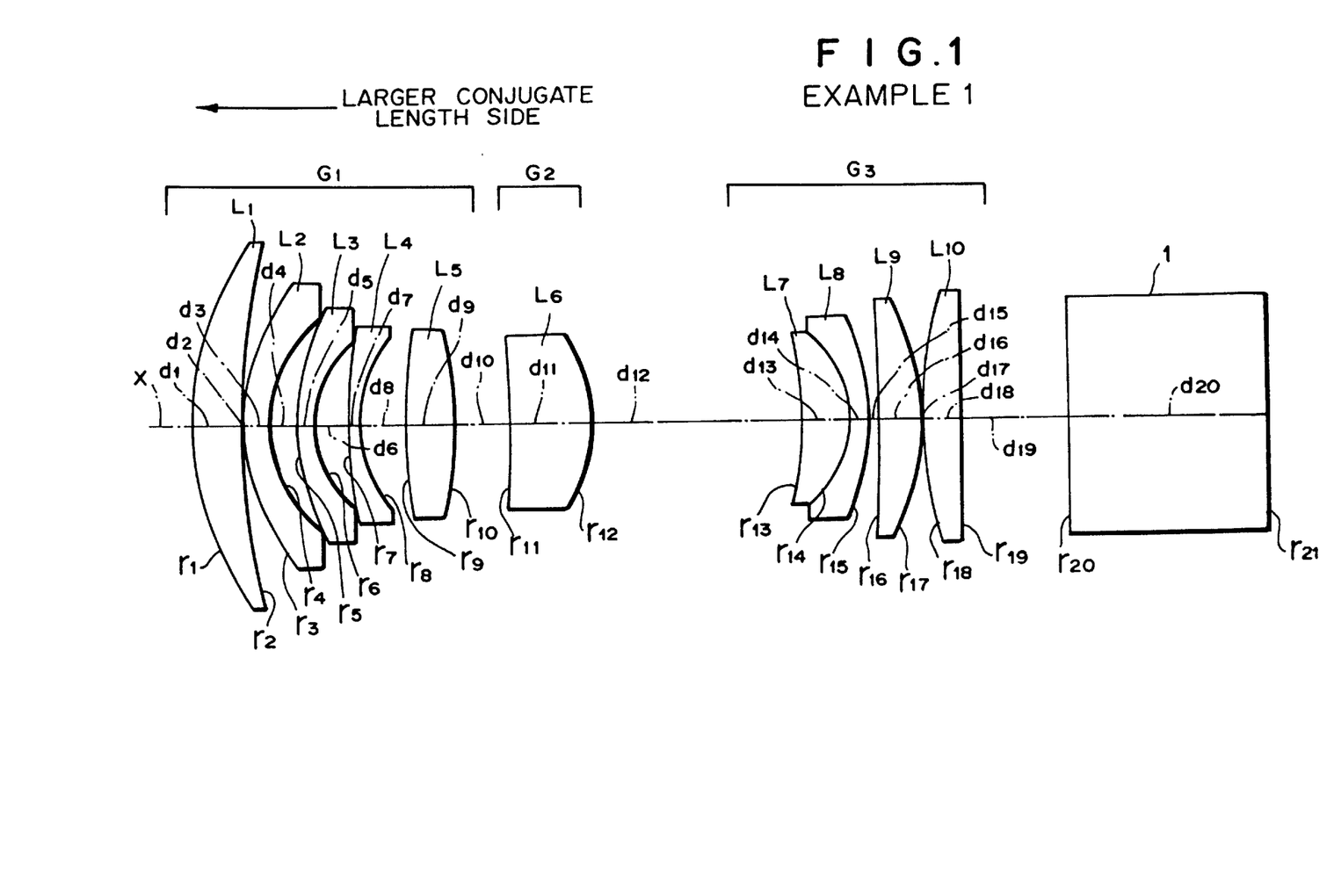
FIG. 1 is a sectional view showing the retro-focus type lens in accordance with Example 1 of the present invention.

The retro-focus type lens in accordance with Example 1 of the present invention will be explained with reference to FIG. 1.

In Example 1, the first lens group $G_1$ comprises, successively from the larger conjugate length side, a positive meniscus lens $L_1$ having a convex surface directed onto the larger conjugate length side; negative meniscus lenses $L_2$, $L_3$, and $L_4$ each having a convex surface directed onto the larger conjugate length side; and a biconvex lens $L_5$ having a surface with a weaker curvature directed onto the larger conjugate length side.

The second lens group $G_2$ is made of a positive meniscus lens $L_6$ having a concave surface directed onto the larger conjugate length side.

The third lens group $G_3$ comprises, successively from the larger conjugate length side, a cemented lens made of a positive meniscus lens $L_7$ having a concave surface directed onto the larger conjugate length side and a negative meniscus lens $L_8$ having a concave surface directed onto the larger conjugate length side, a positive meniscus lens $L_9$ having a concave surface directed onto the larger conjugate length side, and a positive meniscus lens $L_{10}$ having a convex surface directed onto the larger conjugate length side.

Here, assuming that the focal length of the fifth lens $L_5$ disposed on the smallest conjugate length side of the first lens group $G_1$ is $f_{1R}$ and the focal length of the whole system is $f_0$, $f_{1R}/f_0$ is set to 2.38. Accordingly, the above-mentioned conditional expression is satisfied.

In the retro-focus type lens in accordance with Example 1, focal length f is 1.0, F number is 3.5, and angle of view 2 ω is 67.4°.

Table 1 (follows) shows radius of curvature r (mm) of each lens surface, center thickness of each lens and air gap between neighboring lenses d (mm), and refractive index n and Abbe number ν of each lens at d-line in the retro-focus type lens in accordance with Example 1.

In Table 1 and Tables 2 to 5 (follows), which will be explained later, numerals indicating letters r, d, n, and ν successively increase from the larger conjugate length side.

FIGS. 6A to 6D show spherical aberration, astigmatism, distortion, and chromatic aberration in magnification concerning Example 1.

It can be seen from each aberration chart that the retro-focus type lens in accordance with Example 1 maintains favorable optical performances.

EXAMPLE 2

The retro-focus type lens in accordance with Example 2 of the present invention will be explained with reference to FIG. 2.

Figure 2:
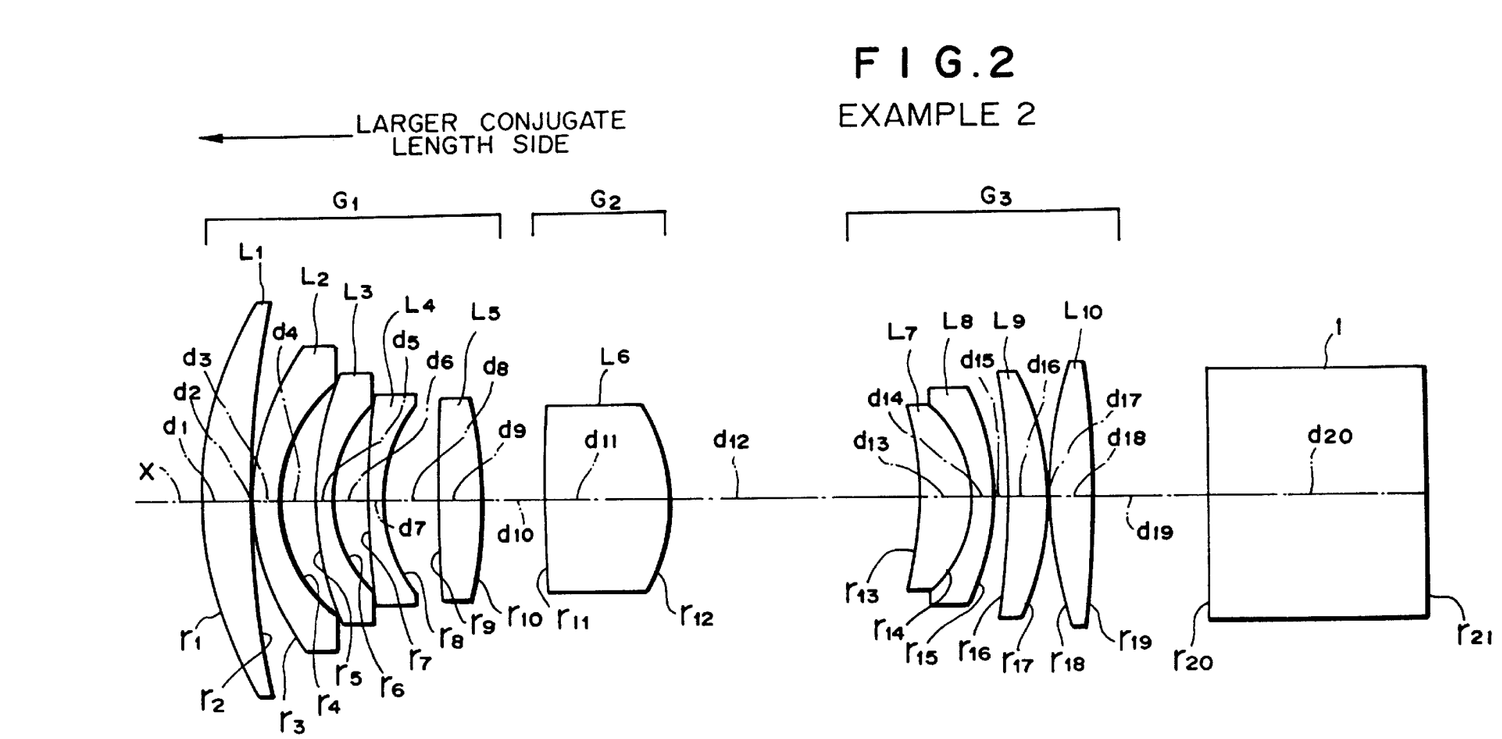
FIG. 2 is a sectional view showing the retro-focus type lens in accordance with Example 2 of the present invention.

As shown in FIG. 2, the retro-focus type lens in accordance with Example 2 has a 10-sheet lens configuration substantially the same as that of the retro-focus type lens in accordance with Example 1 but differs therefrom mainly in that the sixth lens $L_6$ in the second lens group $G_2$ is a biconvex lens having a surface with a smaller curvature directed onto the larger conjugate length side, and that the tenth lens $L_{10}$ in the third lens group $G_3$ is a biconvex lens having a surface with a larger curvature directed onto the larger conjugate length side.

Here, assuming that the focal length of the fifth lens $L_5$ disposed on the smallest conjugate length side of the first lens group $G_1$ is $f_{1R}$ and the focal length of the whole system is $f_0$, $f_{1R}/f_0$ is set to 2.82. Accordingly, the above-mentioned conditional expression is satisfied.

In the retro-focus type lens in accordance with Example 2, focal length f is 1.0, F number is 3.5, and angle of view 2 ω is 67.4°.

Table 2 shows radius of curvature r (mm) of each lens surface, center thickness of each lens and air gap between neighboring lenses d (mm), and refractive index n and Abbe number ν of each lens at d-line in the retro-focus type lens in accordance with Example 2.

FIGS. 7A to 7D show spherical aberration, astigmatism, distortion, and chromatic aberration in magnification concerning Example 2.

It can be seen from each aberration chart that the retro-focus type lens in accordance with Example 2 maintains favorable optical performances.

EXAMPLE 3

The retro-focus type lens in accordance with Example 3 of the present invention will be explained with reference to FIG. 3.

Figure 3:
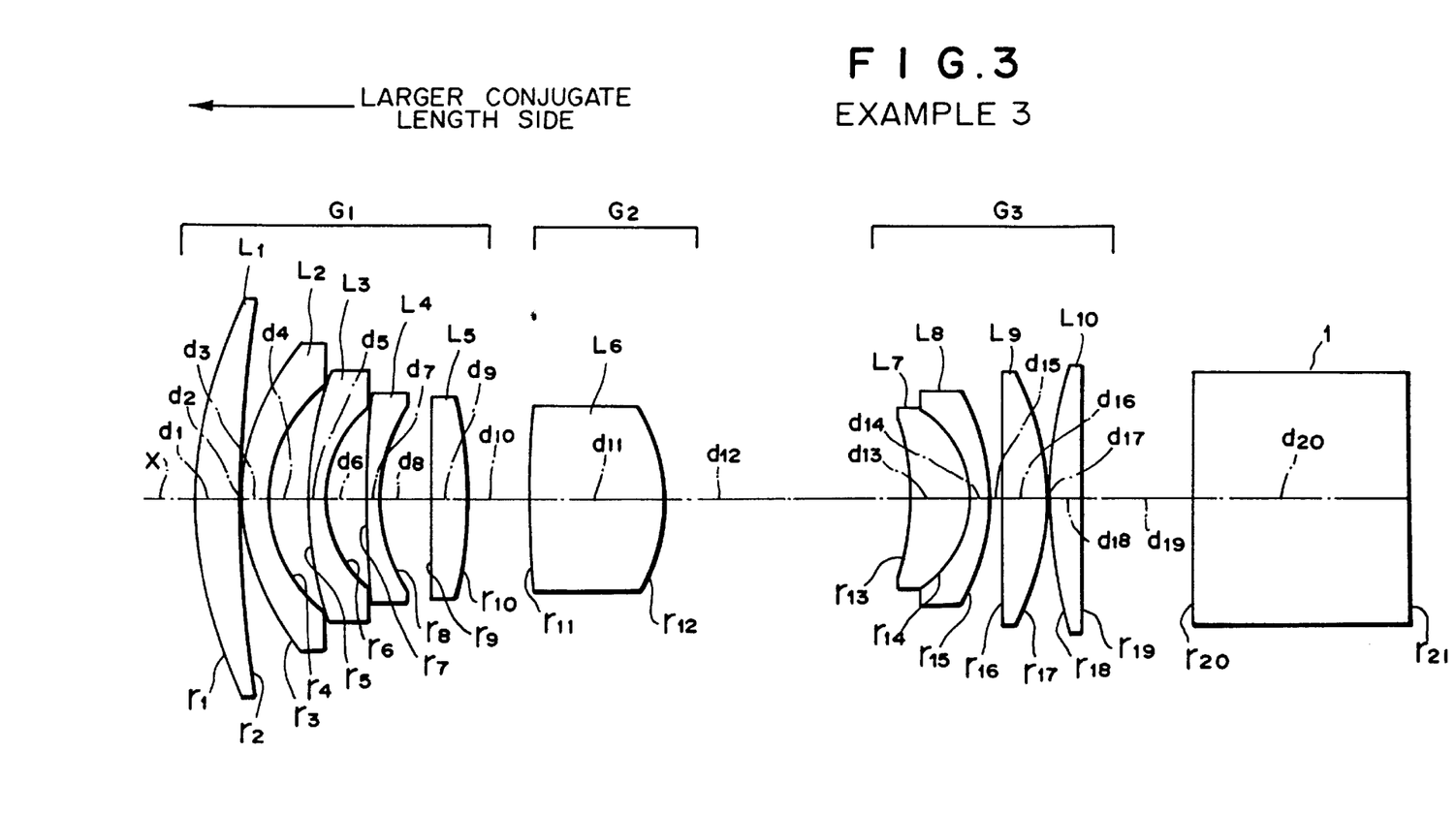
FIG. 3 is a sectional view showing the retro-focus type lens in accordance with Example 3 of the present invention.

As shown in FIG. 3, the retro-focus type lens in accordance with Example 3 has a 10-sheet lens configuration substantially the same as that of the retro- focus type lens in accordance with Example 1 but differs therefrom mainly in that the fifth lens $L_5$ in the first lens group $G_1$ is a positive meniscus lens having a concave surface directed onto the larger conjugate length side, and that the sixth lens $L_6$ in the second lens group $G_2$ is a biconvex lens having a surface with a smaller curvature directed onto the larger conjugate length side.

Here, assuming that the focal length of the fifth lens $L_5$ disposed on the smallest conjugate length side of the first lens group $G_1$ is $f_{1R}$ and the focal length of the whole system is $f_0$, $f_{1R/f0}$ is set to 3.19. Accordingly, the above-mentioned conditional expression is satisfied.

In the retro-focus type lens in accordance with Example 3, focal length f is 1.0, F number is 3.5, and angle of view 2 ω is 67.4°.

Table 3 shows radius of curvature r (mm) of each lens surface, center thickness of each lens and air gap between neighboring lenses d (mm), and refractive index n and Abbe number ν of each lens at d-line in the retro-focus type lens in accordance with Example 3.

FIGS. 8A to 8D show spherical aberration, astigmatism, distortion, and chromatic aberration in magnification concerning Example 3.

It can be seen from each aberration chart that the retro-focus type lens in accordance with Example 3 maintains favorable optical performances.

EXAMPLE 4

The retro-focus type lens in accordance with Example 4 of the present invention will be explained with reference to FIG. 4.

Figure 4:
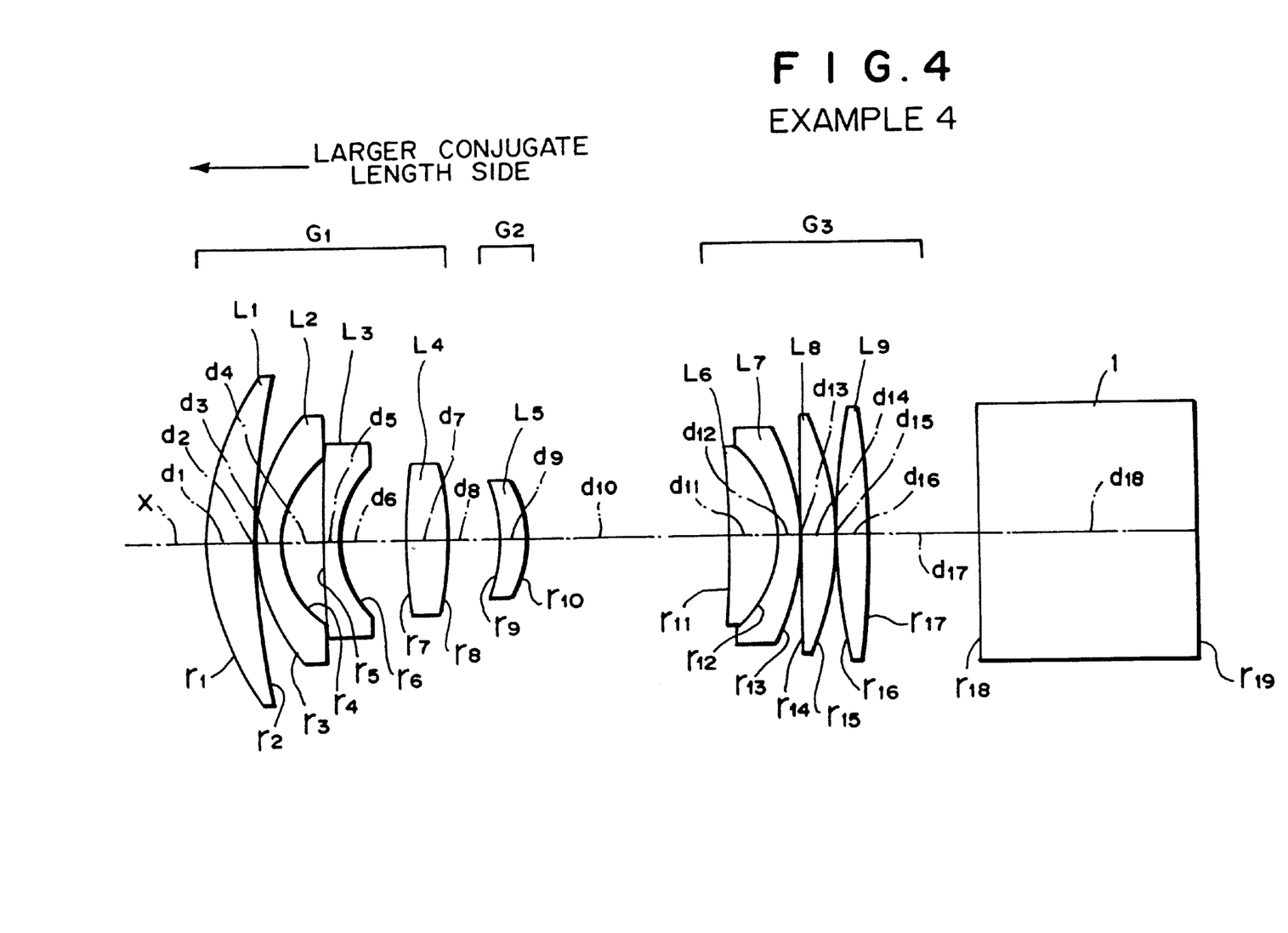
FIG. 4 is a sectional view showing the retro-focus type lens in accordance with Example 4 of the present invention.

As shown in FIG. 4, the retro-focus type lens in accordance with Example 4 has a lens configuration substantially the same as that of the retro-focus type lens in accordance with Example 1 but differs therefrom mainly in that the first lens group $G_1$ has a four-sheet lens configuration, thus yielding a nine-sheet lens configuration as the whole system.

Specifically the first lens group $G_1$ comprises, successively from the larger conjugate length side, a positive meniscus lens $L_1$ having a convex surface directed onto the larger conjugate length side, negative meniscus lenses $L_2$ and $L_3$ each having a convex surface directed onto the larger conjugate length side, and a biconvex lens $L_4$ having a surface with a smaller curvature directed onto the larger conjugate length side. Here, the fourth lens $L_4$ is movable on the optical axis X. Focus adjustment is effected as the fourth lens $L_4$ is moved on the optical axis X.

The second lens group $G_2$ is made of a positive meniscus lens $L_5$ having a concave surface directed onto the larger conjugate length side.

The third lens group $G_3$ comprises, successively from the larger conjugate length side, a cemented lens made of a positive meniscus lens $L_6$ having a concave surface directed onto the larger conjugate length side and a negative meniscus lens $L_7$ having a concave surface directed onto the larger conjugate length side, a biconvex lens $L_8$ having a surface with a smaller curvature directed onto the larger conjugate length side, and a biconvex lens $L_9$ having a surface with a larger curvature directed onto the larger conjugate length side.

Here, assuming that the focal length of the fourth lens $L_4$ disposed on the smallest conjugate length side of the first lens group $G_1$ is $f_{1R}$ and the focal length of the whole system is $f_0$, $f_{1R}/f_0$ is set to 1.65. Accordingly, the above-mentioned conditional expression is satisfied.

In the retro-focus type lens in accordance with Example 4, focal length f is 1.0, F number is 4.0, and angle of view 2 ω is 67.4°.

Table 4 shows radius of curvature r (mm) of each lens surface, center thickness of each lens and air gap between neighboring lenses d (mm), and refractive index n and Abbe number v of each lens at d-line in the retro-focus type lens in accordance with Example 4.

FIGS. 9A to 9D show spherical aberration, astigmatism, distortion, and chromatic aberration in magnification concerning Example 4.

It can be seen from each aberration chart that the retro-focus type lens in accordance with Example 4 maintains favorable optical performances.

EXAMPLE 5

The retro-focus type lens in accordance with Example 5 of the present invention will be explained with reference to FIG. 5.

Figure 5:
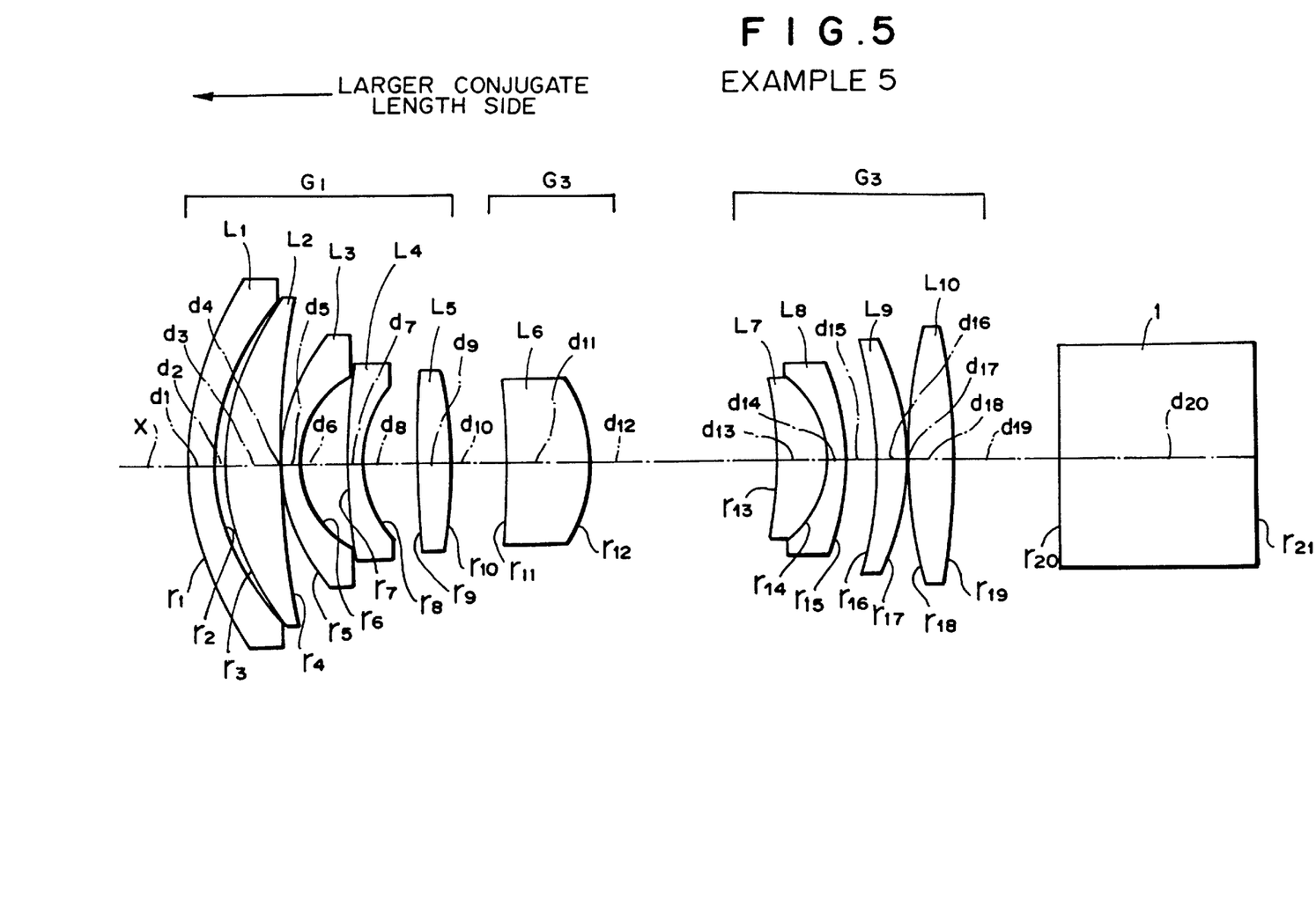
FIG. 5 is a sectional view showing the retro-focus type lens in accordance with Example 5 of the present invention.
Figures 6A, 6B:
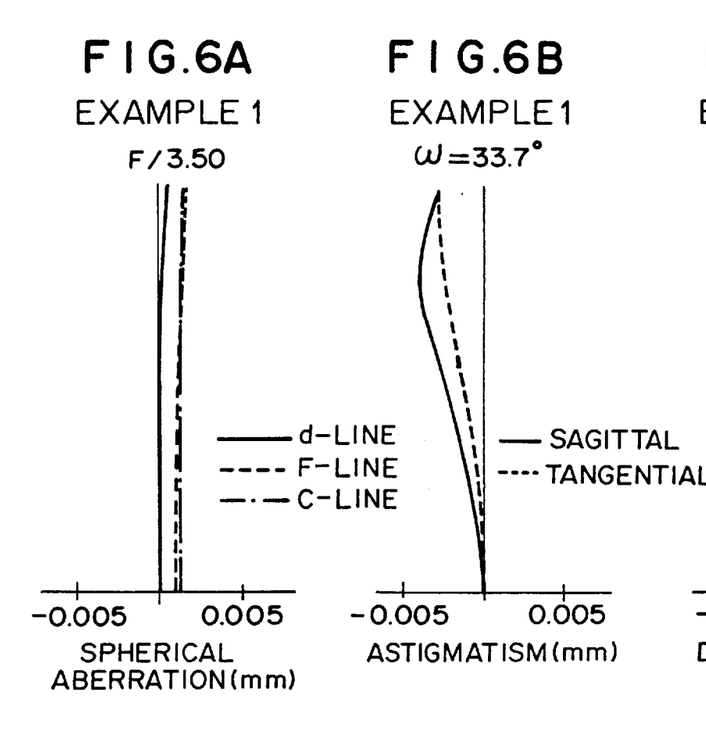
FIGS. 6A, 6B, 6C, and 6D are aberration charts showing various kinds of aberration in the retro-focus type lens in accordance with Example 1 of the present invention.
Figure 6C:
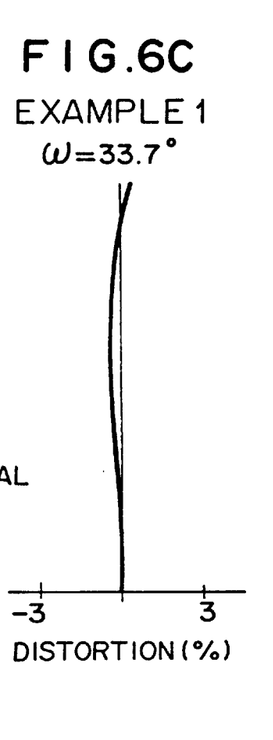
Figure 6D:
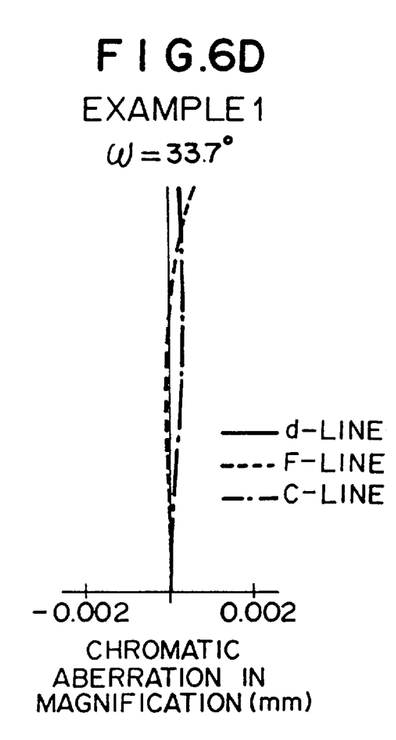
Figures 7A, 7B, 7C:
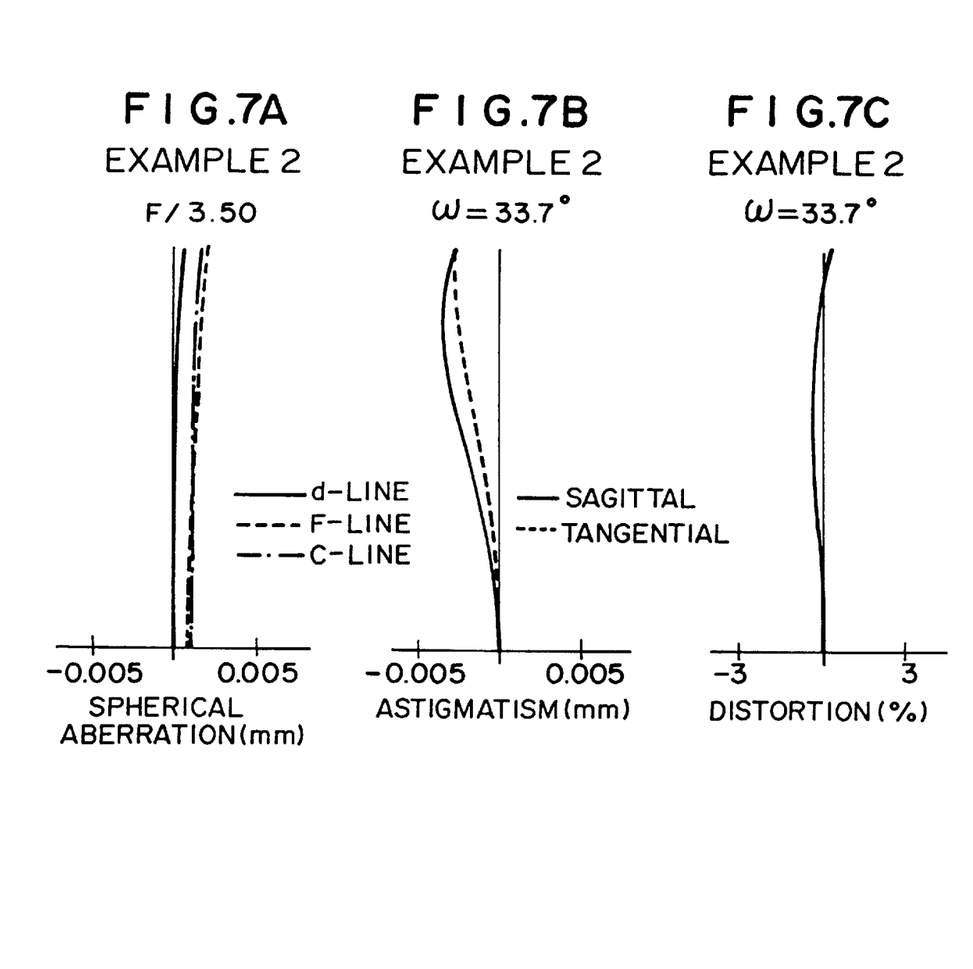
FIGS. 7A, 7B, 7C, and 7D are aberration charts showing various kinds of aberration in the retro-focus type lens in accordance with Example 2 of the present invention.
Figure 7D:
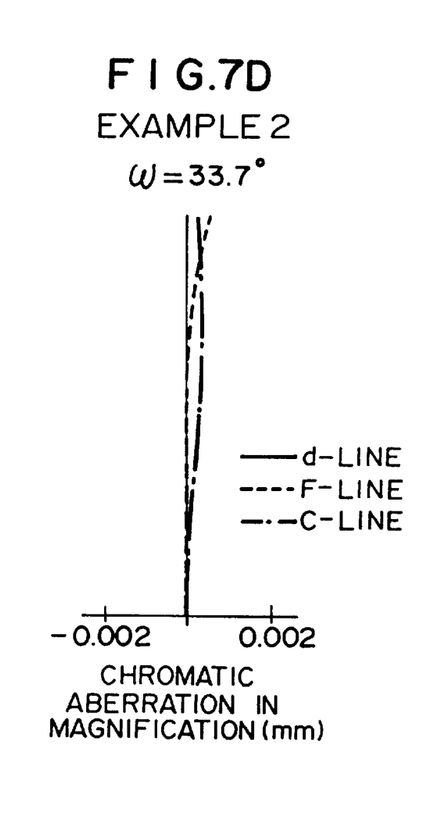
Figures 8A, 8B:
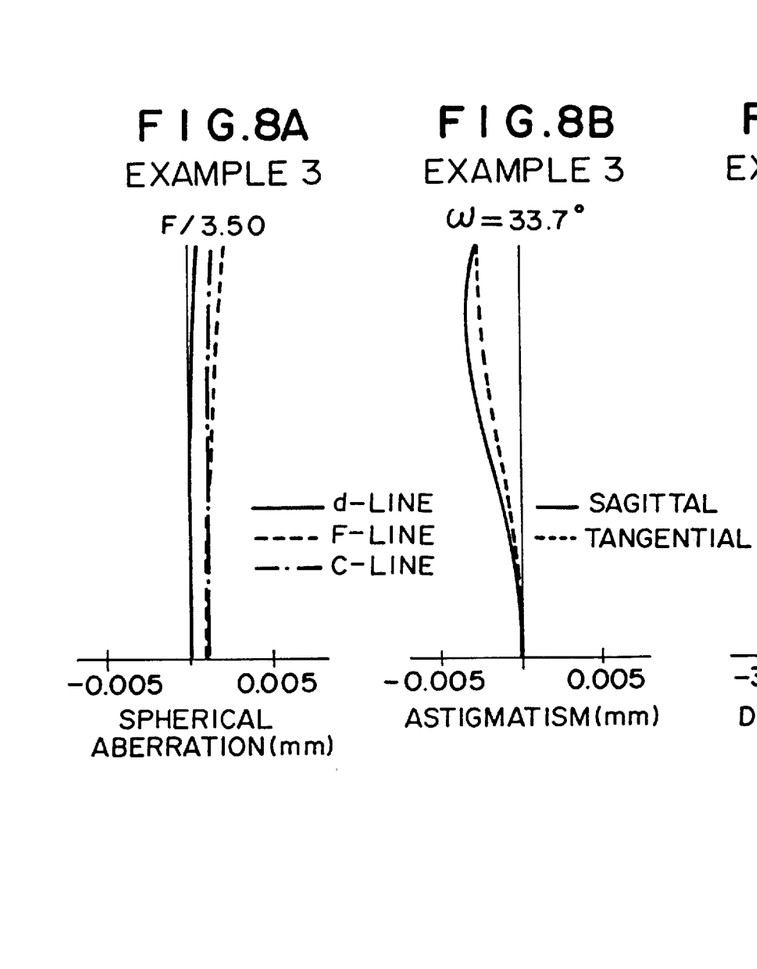
FIGS. 8A, 8B, 8C, and 8D are aberration charts showing various kinds of aberration in the retro-focus type lens in accordance with Example 3 of the present invention.
Figure 8C:
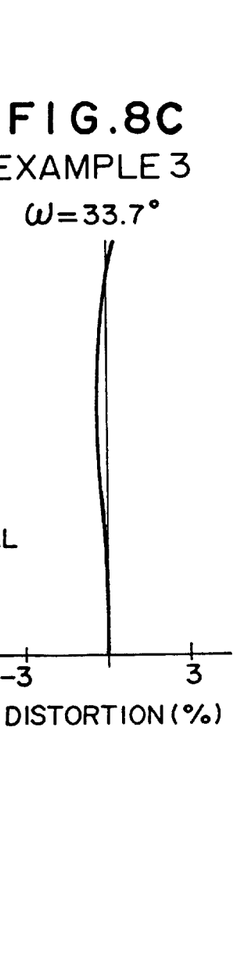
Figure 8D:
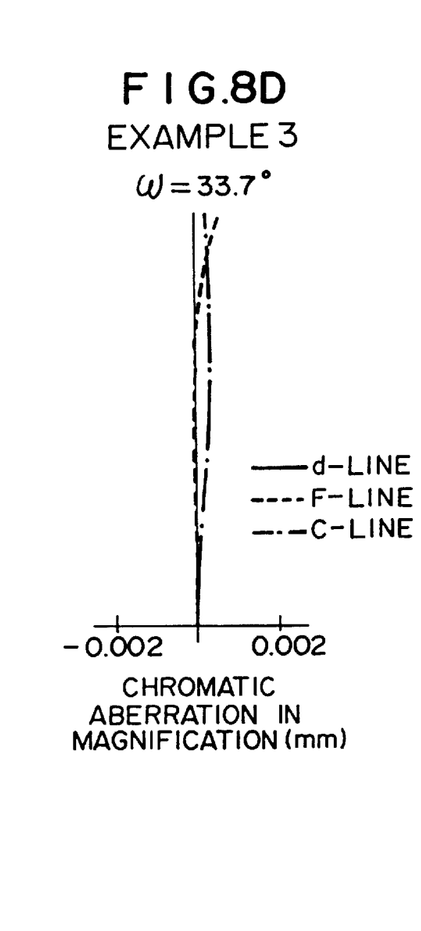
Figures 9A, 9B:
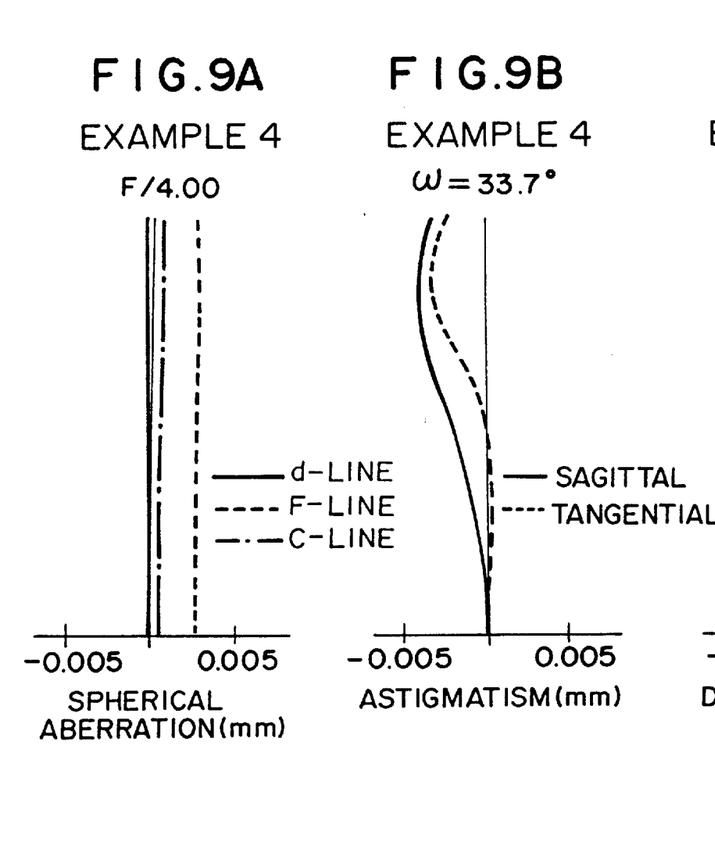
FIGS. 9A, 9B, 9C, and 9D are aberration charts showing various kinds of aberration in the retro-focus type lens in accordance with Example 4 of the present invention.
Figure 9C:
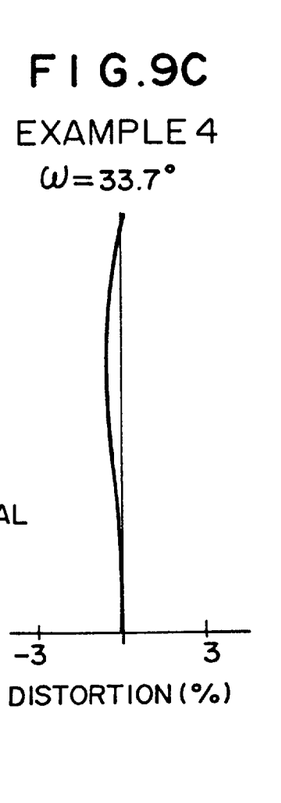
Figure 9D:
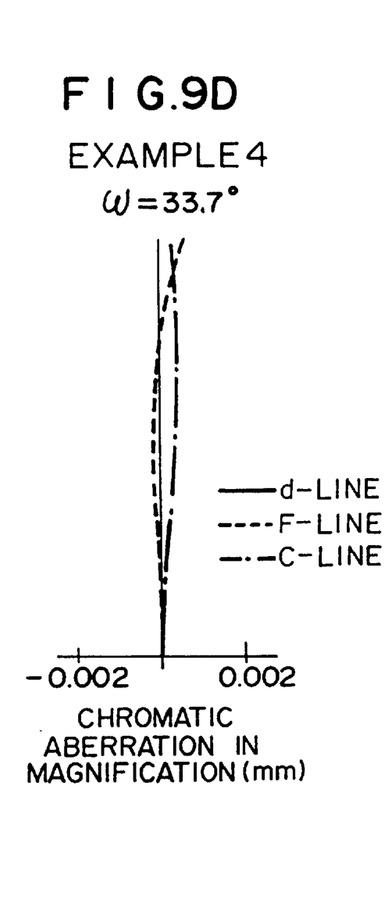
Figures 10A, 10B:
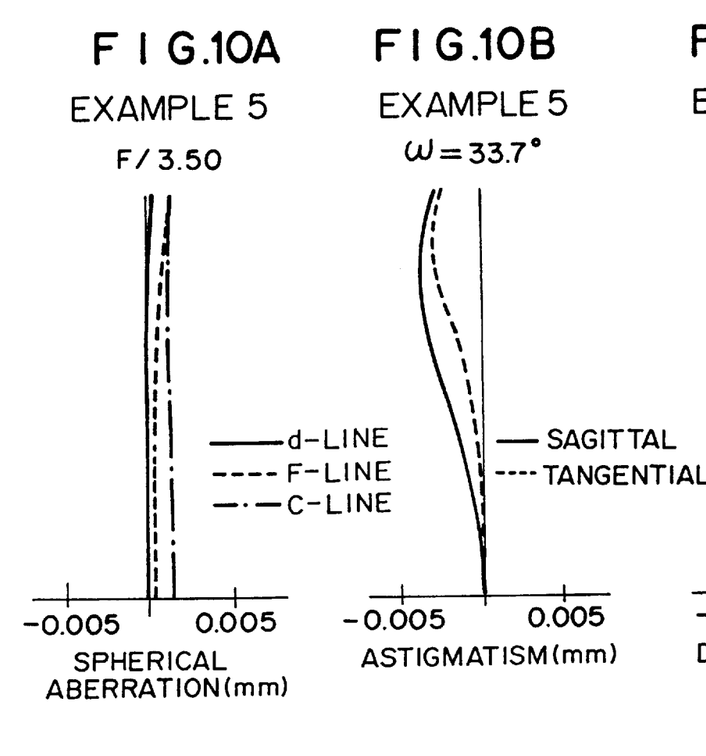
FIGS. 10A, 10B, 10C, and 10D are aberration charts showing various kinds of aberration in the retro-focus type lens in accordance with Example 5 of the present invention.
Figure 10C:
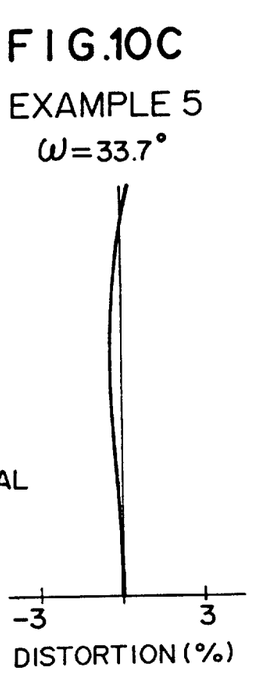
Figure 10D:
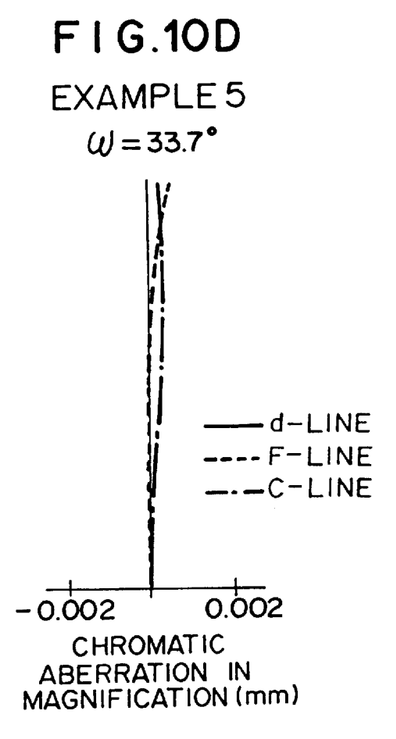

As shown in FIG. 5, the retro-focus type lens in accordance with Example 5 has a 10-sheet lens configuration substantially the same as that of the retro-focus type lens in accordance with Example 1 but differs therefrom mainly in that the first lens $L_1$ in the first lens group $G_1$ is a negative meniscus lens having a convex surface directed onto the larger conjugate length side, that the second lens $L_2$ in the first lens group $G_4$ is a positive meniscus lens having a convex surface directed onto the larger conjugate length side, and that the tenth lens $L_{10}$ in the third lens group $G_3$ is a biconvex lens having a surface with a larger curvature directed onto the larger conjugate length side.

Here, assuming that the focal length of the fifth lens $L_5$ disposed on the smallest conjugate length side of the first lens group $G_1$ is $f_{1R}$ and the focal length of the whole system is $f_0$, $f_{1R}/f_0$ is set to 2.80. Accordingly, the above-mentioned conditional expression is satisfied.

In the retro-focus type lens in accordance with Example 5, focal length f is 1.0, F number is 3.5, and angle of view 2 ω is 67.4°.

Table 5 shows radius of curvature r (mm) of each lens surface, center thickness of each lens and air gap between neighboring lenses d (mm), and refractive index n and Abbe number v of each lens at d-line in the retro-focus type lens in accordance with Example 5.

FIGS. 10A to 10D show spherical aberration, astigmatism, distortion, and chromatic aberration in magnification concerning Example 5.

It can be seen from each aberration chart that the retro-focus type lens in accordance with Example 5 maintains favorable optical performances.

As explained in the foregoing, since the retro-focus type lens in accordance with the present invention is configured such that focal adjustment is effected as the convex lens disposed on the smallest length side of the first lens group is moved on the optical axis, it can provide a compact retro-focus type lens having a long back focus and a telecentric characteristic, ameliorating distortion and chromatic aberration, and comprising a simple focusing structure.

Also, as the first lens group is constituted by at least two convex lenses, and at least two concave lenses each having a surface with a smaller radius of curvature directed onto the smaller conjugate length side, distortion and chromatic aberration can further be ameliorated.

Further, assuming that the focal length of the convex lens disposed on the smallest conjugate length side of the first lens group is $f_{1R}$ and the focal length of the whole system is $f_0$, when the conditional expression of $1.3 < f_{1R}/f_0 < 3.5$ is satisfied, various kinds of aberration, such as chromatic aberration in particular, can be made favorable, whereby the whole lens system can be made compact.

Also, when the third lens group comprises, successively from the larger conjugate length side, a cemented lens composed of a convex lens and a concave lens, and at least two convex lenses, the telecentric characteristic can be further improved, and chromatic aberration can be decreased.

TABLE 1

| Surface | r (mm) | d (mm) | $n_d$ | $v_d$ |
|---|---|---|---|---|
| 1 | 2.233 | 0.327 | 1.77250 | 49.6 |
| 2 | 5.706 | 0.008 | | |
| 3 | 1.522 | 0.174 | 1.83400 | 37.3 |
| 4 | 0.958 | 0.181 | | |
| 5 | 1.678 | 0.121 | 1.83400 | 37.3 |
| 6 | 0.720 | 0.226 | | |
| 7 | 3.029 | 0.102 | 1.83500 | 43.00 |
| 8 | 0.923 | 0.308 | | |
| 9 | 3.748 | 0.341 | 1.69895 | 30.1 |
| 10 | -2.877 | 0.391 | | |
| 11 | -6.458 | 0.537 | 1.51680 | 64.2 |
| 12 | -1.096 | 1.458 | | |
| 13 | -2.238 | 0.333 | 1.51680 | 64.2 |
| 14 | -0.736 | 0.121 | 1.84666 | 23.8 |
| 15 | -1.661 | 0.063 | | |
| 16 | -22.733 | 0.294 | 1.58913 | 61.3 |
| 17 | -1.724 | 0.008 | | |
| 18 | 2.785 | 0.260 | 1.72000 | 50.3 |
| 19 | 982.874 | 0.712 | | |
| 20 | 0.0 | 1.345 | 1.51680 | 64.2 |
| 21 | 0.0 | | | |

TABLE 2

| Surface | r (mm) | d (mm) | $n_d$ | $v_d$ |
|---|---|---|---|---|
| 1 | 2.524 | 0.300 | 1.70154 | 41.2 |
| 2 | 7.266 | 0.008 | | |
| 3 | 1.679 | 0.175 | 1.76182 | 26.6 |
| 4 | 0.961 | 0.210 | | |
| 5 | 1.995 | 0.121 | 1.72342 | 38.0 |
| 6 | 0.856 | 0.217 | | |
| 7 | 5.909 | 0.102 | 1.72342 | 38.0 |
| 8 | 0.947 | 0.343 | | |
| 9 | 12.955 | 0.272 | 1.84666 | 23.8 |
| 10 | -2.902 | 0.393 | | |
| 11 | 18.440 | 0.786 | 1.48749 | 70.4 |
| 12 | -1.195 | 1.569 | | |
| 13 | -2.378 | 0.346 | 1.78749 | 70.4 |
| 14 | -0.743 | 0.121 | 1.84666 | 23.8 |
| 15 | -1.643 | 0.081 | | |
| 16 | -5.330 | 0.259 | 1.62299 | 58.1 |
| 17 | -1.731 | 0.008 | | |
| 18 | 2.849 | 0.285 | 1.62299 | 58.1 |
| 19 | -6.493 | 0.699 | | |
| 20 | 0.0 | 1.345 | 1.51680 | 64.2 |
| 21 | 0.0 | | | |

TABLE 3

| Surface | r (mm) | d (m) | $n_d$ | $v_d$ |
|---|---|---|---|---|
| 1 | 2.753 | 0.288 | 170154 | 41.2 |
| 2 | 8.015 | 0.008 | | |
| 3 | 1.520 | 0.175 | 1.76182 | 26.6 |
| 4 | 0.960 | 0.238 | | |

TABLE 3-continued

| Surface | r (mm) | d (m) | $n_d$ | $v_d$ |
|---|---|---|---|---|
| 5 | 2.365 | 0.121 | 1.72342 | 38.0 |
| 6 | 0.782 | 0.240 | | |
| 7 | 6.459 | 0.102 | 1.72342 | 38.0 |
| 8 | 1.140 | 0.321 | | |
| 9 | −221.088 | 0.228 | 1.84666 | 23.8 |
| 10 | −2.672 | 0394 | | |
| 11 | 5.771 | 0.863 | 1.48749 | 70.4 |
| 12 | −1.236 | 1.568 | | |
| 13 | −1.664 | 0.369 | 1.48749 | 70.4 |
| 14 | −0.688 | 0.121 | 1.84666 | 23.8 |
| 15 | −1.408 | 0.081 | | |
| 16 | −61.789 | 0.290 | 1.62299 | 58.1 |
| 17 | −1.683 | 0.008 | | |
| 18 | 2.911 | 0.208 | 1.62299 | 58.1 |
| 19 | 78.015 | 0.693 | | |
| 20 | 0.0 | 1.345 | 151680 | 64.2 |
| 21 | 0.0 | | | |

TABLE 4

| Surface | r (mm) | d (mm) | $n_d$ | $v_d$ |
|---|---|---|---|---|
| 1 | 1.706 | 0.307 | 1.71300 | 53.9 |
| 2 | 5.132 | 0.005 | | |
| 3 | 1.179 | 0.148 | 1.83400 | 37.3 |
| 4 | 0.641 | 0.269 | | |
| 5 | 6.669 | 0.102 | 1.83400 | 37.3 |
| 6 | 0.639 | 0.422 | | |
| 7 | 4.174 | 0.268 | 1.80610 | 33.3 |
| 8 | −1.890 | 0.322 | | |
| 9 | −1.126 | 0.161 | 1.48749 | 70.4 |
| 10 | −0.770 | 1.269 | | |
| 11 | −5.377 | 0.309 | 1.48749 | 70.4 |
| 12 | −0.724 | 0.121 | 1.84666 | 23.8 |
| 13 | −1.642 | 0.008 | | |
| 14 | 171.607 | 0.211 | 1.48749 | 70.4 |
| 15 | −1.820 | 0.008 | | |
| 16 | 4.190 | 0.193 | 1.77250 | 49.6 |
| 17 | −5.518 | 0.684 | | |
| 18 | 0.0 | 1.345 | 1.51680 | 64.2 |
| 19 | 0.0 | | | |

TABLE 5

| Surface | r (mm) | d (mm) | $n_d$ | $v_d$ |
|---|---|---|---|---|
| 1 | 2.234 | 0.176 | 1.84666 | 23.8 |
| 2 | 1.592 | 0.079 | | |
| 3 | 1.808 | 0.367 | 1.83500 | 43.0 |
| 4 | 6.305 | 0.008 | | |
| 5 | 1.320 | 0.122 | 1.83500 | 43.0 |
| 6 | 0.668 | 0.333 | | |
| 7 | 3.886 | 0.103 | 1.83500 | 43.0 |

TABLE 5-continued

| Surface | r (mm) | d (mm) | $n_d$ | $v_d$ |
|---|---|---|---|---|
| 8 | 0.832 | 0.378 | | |
| 9 | 8.824 | 0.232 | 1.84666 | 23.8 |
| 10 | −3.208 | 0.381 | | |
| 11 | −5.677 | 0.594 | 1.51680 | 64.2 |
| 12 | −1.046 | 1.282 | | |
| 13 | −2.233 | 0.350 | 1.60311 | 60.7 |
| 14 | −0.666 | 0.122 | 1.84666 | 23.8 |
| 15 | −1.772 | 0.209 | | |
| 16 | −2.895 | 0.202 | 1.77250 | 49.6 |
| 17 | −1.828 | 0.008 | | |
| 18 | 3.577 | 0.303 | 1.80420 | 46.5 |
| 19 | −4.591 | 0.718 | | |
| 20 | 0.0 | 1.345 | 1.51680 | 64.2 |
| 21 | 0.0 | | | |

What is claimed is:

1. A retro-focus type lens comprising, successively from a larger conjugate length side:

a first lens group having a negative refracting power and including a convex lens disposed on the smallest conjugate length side, a second lens group having a positive refracting power and causing a luminous flux diverged by the first lens group to become substantially afocal, and a third lens group having a positive refracting power;
   wherein the convex lens disposed on the smallest conjugate length side of the first lens group is moved on an optical axis so as to effect focus adjustment.

2. A retro-focus type lens according to claim 1, wherein said first lens group comprises:

at least two convex lenses, and at least two concave lenses each having a surface with a smaller radius of curvature directed onto the smaller conjugate length side.

3. A retro-focus type lens according to claim 1, satisfying the following conditional expression:

$$1.3 < f_{1R}/f_0 < 3.5$$

wherein $f_{1R}$ is a focal length of the convex lens disposed on the smallest conjugate length side of the first lens group, and $f_0$ is a focal length of the whole system.

4. A retro-focus type lens according to claim 1, wherein the third lens group comprises, successively from the larger conjugate length side:

a cemented lens composed of a convex lens and a concave lens, and at least two convex lenses.

* * * * *